United States Patent
Ikuno et al.

(10) Patent No.: US 9,469,751 B2
(45) Date of Patent: Oct. 18, 2016

(54) RESIN COMPOSITION AND RESIN MOLDED ARTICLE

(71) Applicant: FUJI XEROX CO., LTD., Tokyo (JP)

(72) Inventors: Masaya Ikuno, Kanagawa (JP); Masahiro Moriyama, Kanagawa (JP); Manabu Kawashima, Kanagawa (JP); Kenji Yao, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 14/621,764

(22) Filed: Feb. 13, 2015

(65) Prior Publication Data

US 2016/0090472 A1  Mar. 31, 2016

(30) Foreign Application Priority Data

Sep. 26, 2014 (JP) ................................. 2014-196867

(51) Int. Cl.
  *C08L 1/12* (2006.01)
  *C08L 1/10* (2006.01)

(52) U.S. Cl.
  CPC .............. *C08L 1/12* (2013.01); *C08L 2207/04* (2013.01)

(58) Field of Classification Search
  CPC ........................................................ C08L 1/12
  See application file for complete search history.

(56) References Cited

U.S. PATENT DOCUMENTS

| | | |
|---|---|---|
| 2005/0187315 A1 | 8/2005 | Dean |
| 2011/0319529 A1 | 12/2011 | Helmer et al. |
| 2011/0319530 A1 | 12/2011 | Helmer et al. |
| 2011/0319531 A1 | 12/2011 | Helmer et al. |
| 2011/0319532 A1 | 12/2011 | Helmer et al. |
| 2013/0131221 A1 | 5/2013 | Basu et al. |
| 2013/0150484 A1 | 6/2013 | Basu et al. |
| 2013/0150491 A1 | 6/2013 | Basu et al. |
| 2013/0150492 A1 | 6/2013 | Shelby et al. |
| 2013/0150493 A1 | 6/2013 | Shelby et al. |
| 2013/0150494 A1 | 6/2013 | Basu et al. |
| 2013/0150495 A1 | 6/2013 | Shelby et al. |
| 2013/0150496 A1 | 6/2013 | Basu et al. |
| 2013/0150497 A1 | 6/2013 | Basu et al. |
| 2013/0150498 A1 | 6/2013 | Basu et al. |
| 2013/0150499 A1 | 6/2013 | Basu et al. |
| 2013/0150500 A1 | 6/2013 | Shelby et al. |
| 2013/0150501 A1 | 6/2013 | Basu et al. |

FOREIGN PATENT DOCUMENTS

| | | | |
|---|---|---|---|
| JP | 2007-523252 | * | 8/2007 |
| JP | 4881165 B2 | | 2/2012 |
| JP | 2013-529725 A | | 7/2013 |

* cited by examiner

*Primary Examiner* — Robert Harlan
(74) *Attorney, Agent, or Firm* — Oliff PLC

(57) ABSTRACT

A resin composition includes at least a cellulose ester resin, a non-reactive plasticizer that does not have a functional group reactable with the cellulose ester resin, and a polyolefin-containing polyfunctional elastomer that includes polyolefin obtained by polymerizing olefins having 2 to 4 carbon atoms as a main component and that has a plurality of functional groups reactable with the cellulose ester resin.

9 Claims, No Drawings

RESIN COMPOSITION AND RESIN MOLDED ARTICLE

CROSS-REFERENCE TO RELATED APPLICATIONS

This application is based on and claims priority under 35 USC 119 from Japanese Patent Application No. 2014-196867 filed Sep. 26, 2014.

BACKGROUND

1. Technical Field

The present invention relates to a resin composition and a resin molded article.

2. Related Art

In the related art, various resin compositions are provided to be used for various uses. Particularly, a thermoplastic resin may be used in various components, housings, or the like of home appliances or automobiles and in components such as housings of business machines and electric and electronic apparatuses.

Recently, plant-derived resins are being used, and one of the plant-derived resins known in the related art is a cellulose derivative.

SUMMARY

According to an aspect of the invention, there is provided a resin composition including: at least a cellulose ester resin;

a non-reactive plasticizer that does not have a functional group reactable with the cellulose ester resin; and a polyolefin-containing polyfunctional elastomer that includes polyolefin obtained by polymerizing olefins having 2 to 4 carbon atoms as a main component and that has a plurality of functional groups reactable with the cellulose ester resin.

DETAILED DESCRIPTION

Hereinafter, an exemplary embodiment which is an example of a resin composition and a resin molded article according to the exemplary embodiment of the invention is described.

Resin Composition

A resin composition according to the exemplary embodiment includes at least (A) a cellulose ester resin, (B) a non-reactive plasticizer that does not have a functional group reactable with the cellulose ester resin, and (C) a polyolefin-containing polyfunctional elastomer that includes polyolefin obtained by polymerizing olefins having 2 to 4 carbon atoms as a main component and that has plural functional groups reactable with the cellulose ester resin.

Further, the "main component" in the polyolefin-containing polyfunctional elastomer refers to an elastomer in which 50% by weight or more of a polyolefin obtained by polymerizing olefins having 2 to 4 carbon atoms with respect to the total monomer components is used and polymerized. In addition, a ratio of the polyolefin to the total monomer components is more preferably 60% by weight or greater.

In the related art, the cellulose ester resin is used as the resin composition. However, the resin molded article obtained by molding the resin composition prepared by using the cellulose ester resin has poor resistance to an impact and thus, when an impact is applied to a surface, fractures may occur or holes may be made. Therefore, the shock resistance is needed to be improved.

On the contrary, the resin composition according to the exemplary embodiment includes (A) a cellulose ester resin, (B) a non-reactive plasticizer, and (C) a polyolefin-containing polyfunctional elastomer so that excellent shock resistance may be obtained.

The mechanism that has the above effects is not clear, but it is assumed for the following reasons.

In the cellulose ester resin, micro fibrils exist in a bundle form, and chains thereof are strongly bonded by hydrogen bonds so that flexibility is not likely to be obtained.

Therefore, it is considered that the shock resistance on the surface is poor as described above.

On the contrary, according to the exemplary embodiment, it is considered that the non-reactive plasticizers enter portions between the cellulose ester resins to inhibit the hydrogen bonds so that the portions between the cellulose ester resins are gradually widened. Also, the polyolefin-containing polyfunctional elastomers that have affinity with the non-reactive plasticizers and the cellulose ester resins move to the widened portions between the cellulose ester resins, and the functional groups of the cellulose ester resins and the functional groups of the polyolefin-containing polyfunctional elastomers react with each other. As a result, the portions between the cellulose ester resins may be further widened, and the flexible components (polyolefin-containing polyfunctional elastomers) are fixed to the portions between the cellulose ester resins. Therefore, it is considered that the shock resistance on the surface is enhanced.

Further, since the non-reactive plasticizer does not have a functional group that is reactable with the cellulose ester resin, the reaction between the cellulose ester resin and the polyolefin-containing polyfunctional elastomer favorably proceeds without being inhibited by the non-reactive plasticizer.

In addition, it is considered that the affinity with the non-reactive plasticizer and the cellulose ester resin is improved, since the polyolefin-containing polyfunctional elastomer includes a polyolefin obtained by polymerizing olefins having 2 to 4 carbon atoms as a main component. When the polyolefin-containing polyfunctional elastomer includes the polyolefin obtained by polymerizing olefins having carbon atoms of more than 4 as a main component, it is considered that the affinity with the non-reactive plasticizer and the cellulose ester resin is deteriorated.

Hereinafter, components of the resin composition according to the exemplary embodiment will be described in detail.

(A) Cellulose Ester Resin

The resin composition according to the exemplary embodiment contains the cellulose ester resin. Specifically, for example, as the cellulose ester resin, the cellulose ester resin represented by Formula (1) is used.

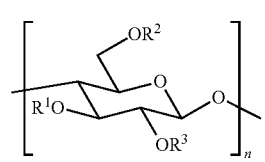

Formula (1)

In Formula (1), each of $R^1$, $R^2$, and $R^3$ independently represents a hydrogen atom or an acyl group having 1 to 3 carbon atoms, and n represents an integer of 1 or greater.

In Formula (1), as the acyl group represented by $R^1$, $R^2$, and $R^3$, an acetyl group, a propionyl group, a butyryl group, or the like may be used. As the acyl group, the acetyl group is preferable.

In Formula (1), a range of n is not particularly limited, but a range of 250 to 750 is preferable, and a range of 350 to 600 is more preferable.

If n is 250 or greater, the strength of the resin molded article is easily increased. If n is 750 or less, the decrease of the flexibility of the resin molded article is easily prevented.

Here, in Formula (1), the term "each of $R^1$, $R^2$, and $R^3$ independently represents an acyl group" indicates that at least a portion of a hydroxyl group of the cellulose ester resin represented by Formula (1) is acylated.

That is, n items of $R^1$ in a cellulose ester resin molecule may be totally or partially the same, or may be different from each other. In the same manner, n items of $R^2$, and n items of $A^3$ may be totally or partially the same, or may be different from each other, respectively.

The substitution degree of the cellulose ester resin is preferably from 2.1 to 2.6, and more preferably from 2.2 to 2.5.

If the substitution degree is 2.1 or greater, the affinity with the polyether ester compound is easily increased. If the substitution degree is 2.6 or less, the crystallization of the cellulose ester resin is prevented, and the thermoplasticity is easily exhibited. In addition, the moldability of the resin composition is enhanced.

In addition, the substitution degree is an index that indicates a degree of the acylation of the cellulose ester resin. Specifically, the substitution degree means an average of the number of substitutions in a molecule in which three hydroxyl groups existing in a D-glucopyranose unit of the cellulose ester resin are substituted with the acyl groups.

Here, particularly, the cellulose ester resin has an acetyl group as an acyl group independently represented by each of $R^1$, $R^2$, and $R^3$, and is preferably a resin of which the substitution degree is from 2.1 to 2.6.

In addition, the weight average molecular weight (Mw) of the cellulose ester resin is preferably from 100,000 to 300,000, and more preferably from 150,000 to 200,000.

The weight average molecular weight is a value obtained by the same method as a measurement method of a weight average molecular weight of the polyether ester compound described below.

Hereinafter, specific examples of the cellulose ester resin are described, but the exemplary embodiment of the invention is not limited thereto.

| Compound Name | Product Name | Vendor | Substituent $R^1$, $R^2$, $R^3$ | Substitution degree |
|---|---|---|---|---|
| CE1 | Diacetyl cellulose | L-50 | Daicel | Hydrogen atom or acetyl group | 2.5 |
| CE2 | Diacetyl cellulose | L-20 | Daicel | Hydrogen atom or acetyl group | 2.5 |
| CE3 | Diacetyl cellulose | Modified product of L-50 | Daicel | Hydrogen atom or acetyl group | 2.4 |
| CE4 | Diacetyl cellulose | Modified product of L-50 | Daicel | Hydrogen atom or acetyl group | 2.0 |
| CE5 | Diacetyl cellulose | Modified product of L-20 | Daicel | Hydrogen atom or acetyl group | 2.4 |
| CE6 | Cellulose triacetate | LT-55 | Daicel | Hydrogen atom or acetyl group | 2.7 |

-continued

| Compound Name | Product Name | Vendor | Substituent $R^1$, $R^2$, $R^3$ | Substitution degree |
|---|---|---|---|---|
| CE7 | Cellulose acetate propionate | CAP482-20 | Eastman Chemical | Hydrogen atom, acetyl group, or propionyl group | 2.6 |
| CE8 | Cellulose acetate butyrate | CAB381-0.1 | Eastman Chemical | Hydrogen atom, acetyl group, or butyryl group | 2.6 |

(B) Non-Reactive Plasticizer

The term "non-reactive" in the non-reactive plasticizer according to the exemplary embodiment means not having a functional group that is reactable with (A) the cellulose ester resin.

The non-reactive plasticizer is not particularly limited as long as the plasticizer does not have a functional group that is reactable with the cellulose ester resin. For example, the non-reactive plasticizer may be a compound having an ester, and more specifically, may be a polyether ester compound and an adipic acid ester-containing compound.

Polyether Ester Compound

Specific examples of the polyether ester compound include a polyether ester compound represented by Formula (2).

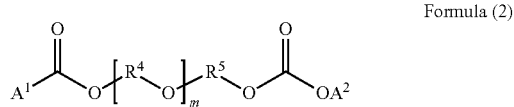

Formula (2)

In Formula (2), each of $R^4$ and $R^5$ independently represents an alkylene group having 2 to 10 carbon atoms. Each of $A^1$ and $A^2$ independently represents an alkyl group having 1 to 6 carbon atoms, an aryl group having 6 to 12 carbon atoms, or an aralkyl group having 7 to 18 carbon atoms. m represents an integer of 1 or greater.

In Formula (2), as the alkylene group represented by $R^4$, an alkylene group having 3 to 10 carbon atoms is preferable, and an alkylene group having 3 to 6 carbon atoms is more preferable. The alkylene group represented by $R^4$ may be any one of straight-chain, branched-chain, and cyclic, and a straight-chain alkylene group is preferable.

If the alkylene group represented by $R^4$ has 3 or more carbon atoms, the decrease of the liquidity of the resin composition is prevented, and the thermoplasticity is easily exhibited. If the alkylene group represented by $R^4$ has 10 or less carbon atoms, or the alkylene group represented by $R^4$ is a straight-chain alkylene group, the affinity with the cellulose ester resin is easily enhanced.

In view of these, the alkylene group represented by $R^4$ is preferably an n-hexylene group ($—(CH_2)_6—$). That is, the polyether ester compound is preferably a compound in which $R^4$ represents an n-hexylene group ($—(CH_2)_6—$).

In Formula (2), as the alkylene group represented by $R^5$, an alkylene group having 3 to 10 carbon atoms is preferable, and an alkylene group having 3 to 6 carbon atoms is more preferable. The alkylene group represented by $R^5$ may be any one of straight-chain, branched-chain, and cyclic, but a straight-chain alkylene group is preferable.

If the alkylene group represented by $R^5$ has 3 or more carbon atoms, the decrease of the liquidity of the resin composition is prevented, and the thermoplasticity is easily exhibited. If the alkylene group represented by $R^5$ has 10 or less carbon atoms or the alkylene group represented by $R^5$ is a straight-chain alkylene group, the affinity with the cellulose ester resin is easily enhanced.

In view of these, specifically, the alkylene group represented by $R^5$ is preferably an n-butyrene group ($—(CH_2)_4—$). That is, the polyether ester compound is preferably a compound in which $R^5$ represents an n-butyrene group ($—(CH_2)_4—$).

In Formula (2), the alkyl group represented by $A^1$ and $A^2$ is preferably an alkyl group having 1 to 6 carbon atoms, and more preferably an alkyl group having 2 to 4 carbon atoms. The alkyl group represented by $A^1$ and $A^2$ may have any one of straight-chain, branched-chain, and cyclic, and a branched-chain alkyl group is preferable.

As the aryl group represented by $A^1$ and $A^2$, an unsubstituted aryl group such as a phenyl group or a naphtyl group; a substituted phenyl group such as a methylphenyl group, a t-butylphenyl group, and the like are included.

The aralkyl group represented by $A^1$ and $A^2$ is a group represented by $—R^4$-Ph. $R^4$ represents a straight-chain or branched-chain alkylene group having 1 to 6 carbon atoms (preferably having 2 to 4 carbon atoms). Ph represents an unsubstituted phenyl group or a substituted phenyl group substituted with a straight-chain or branched-chain alkyl group having 1 to 6 carbon atoms (preferably having 2 to 4 carbon atoms). Specific examples of the aralkyl group include an unsubstituted aralkyl group such as a benzyl group, a phenylmethyl group (phenethyl group), a phenylpropyl group, a phenylbutyl group; and a substituted aralkyl group such as a methyl benzyl group, a dimethyl benzyl group, and a methyl phenethyl group.

At least one of $A^1$ and $A^2$ is preferably represented by an aryl group or an aralkyl group. That is, the polyether ester compound is preferably a compound in which at least one of $A^1$ and $A^2$ represents an aryl group (preferably, a phenyl group) or an aralkyl group, and more preferably a compound in which both of $A^1$ and $A^2$ represent an aryl group (preferably, a phenyl group) or an aralkyl group (particularly, an aryl group (preferably, a phenyl group)). In the polyether ester compound in which at least one of $A^1$ and $A^2$ represents an aryl group (preferably, a phenyl group) or an aralkyl group, an appropriate space is easily formed between molecules of the cellulose ester resin, and the crystallization of the cellulose is further prevented. In addition, the moldability of the resin composition is enhanced.

In Formula (2), a range of m is not particularly limited, but a range of 1 to 5 is preferable, and a range of 1 to 3 is more preferable.

If m is 1 or greater, the polyether ester compound is not likely to bleed (deposition). If m is 5 or less, the affinity with the cellulose ester resin is easily increased.

Subsequently, the characteristics of the polyether ester compound are described.

The weight average molecular weight (Mw) of the polyether ester compound is preferably 450 to 650, and more preferably 500 to 600.

If the weight average molecular weight (Mw) is 450 or greater, the polyether ester compound is not likely to bleed (deposition phenomenon). If the weight average molecular weight (Mw) is 650 or less, the affinity with the cellulose ester resin is easily enhanced.

In addition, the weight average molecular weight (Mw) is a value measured by gel permeation chromatography (GPC).

Specifically, the measurement of the molecular weight by GPC is performed with a chloroform solvent using HPLC1100 manufactured by Tosoh Corporation as a measurement apparatus, and by using a TSKgel GMHHR-M+ TSKgel GMHHR-M column (7.8 mm I.D.×30 cm) manufactured by Tosoh Corporation. Also, the weight average molecular weight is calculated by using a molecular weight calibration curve created by a monodispersed polystyrene standard test sample from the test result.

The viscosity of the polyether ester compound at 25° C. is preferably from 35 mPa·s to 50 mPa·s, and more preferably from 40 mPa·s to 45 mPa·s.

If the viscosity is 35 mPa·s or greater, the dispersibility in the cellulose ester resin is likely to be increased. If the viscosity is 50 mPa·s or less, the anisotropy of the dispersion of the polyether ester compound is not likely to be exhibited.

In addition, the viscosity is a value measured by using a Brookfield B-type viscometer.

The Hazen color number (APHA) of the polyether ester compound is preferably from 100 to 140, and more preferably from 100 to 120.

If the Hazen color number (APHA) is 100 or greater, the difference in refractive index from the cellulose ester resin becomes smaller, and a phenomenon in which the resin molded article becomes whitish hazy does not likely occur. If the Hazen color number (APHA) is 140 or smaller, a yellowish color is not likely to be seen in the resin molded article. Therefore, if the Hazen color number (APHA) is in the range described above, the transparency of the resin molded article is enhanced.

The Hazen color number (APHA) is a value measured in conformity to JIS-K0071 (1998).

The solubility parameter of the polyether ester compound (SP value) is preferably from 9 to 11, and more preferably from 9.5 to 10.

If the solubility parameter (SP value) is from 9 to 11, the dispersibility in the cellulose ester resin is easily enhanced.

The solubility parameter (SP value) is a value calculated by a method of Fedor. Specifically, for example, the solubility parameter (SP value) is calculated by an equation in conformity with Polym. Eng. Sci., vol. 14, page 147 (1974).

Equation: SP value=$\sqrt{(Ev/v)}=\sqrt{(\Sigma\Delta ei/\Sigma\Delta vi)}$ (in the equation, Ev: evaporation energy (cal/mol), v: molar volume (cm$^3$/mol), $\Delta$ei: evaporation energies of respective atoms and atomic groups, $\Delta$vi: molar volumes of respective atoms and atomic groups)

In addition, the solubility parameter (SP value) employs (cal/cm$^3$)$^{1/2}$ as a unit, but according to practices, the unit is omitted, and the solubility parameter is indicated in a dimensionless manner.

Here, the polyether ester compound is preferably a compound having an n-butylene group as $R^5$, an aryl group or an aralkyl group as at least one of $A^1$ and $A^2$, and the weight average molecular weight (Mw) of from 450 to 650.

In addition, in view of the same, the polyether ester compound is preferably a compound that has a viscosity of 35 mPa·s to 50 mPa·s at 25° C., that has the Hazen color number (APHA) of 100 to 140, and that has the solubility parameter (SP value) of 9 to 11.

Hereinafter, specific examples of the polyether ester compound are described, but the exemplary embodiment of the invention is not limited thereto.

|  | R⁴ | R⁵ | A¹ | A² | Mw | Viscosity (25° C.) | APHA | SP value |
|---|---|---|---|---|---|---|---|---|
| PEE1 | —(CH₂)₆— | —(CH₂)₄— | Phenyl group | Phenyl group | 550 | 43 | 120 | 9.7 |
| PEE2 | —(CH₂)₂— | —(CH₂)₄— | Phenyl group | Phenyl group | 570 | 44 | 115 | 9.4 |
| PEE3 | —(CH₂)₁₀— | —(CH₂)₄— | Phenyl group | Phenyl group | 520 | 48 | 110 | 10.0 |
| PEE4 | —(CH₂)₆— | —(CH₂)₂— | Phenyl group | Phenyl group | 550 | 43 | 115 | 9.3 |
| PEE5 | —(CH₂)₆— | —(CH₂)₁₀— | Phenyl group | Phenyl group | 540 | 45 | 115 | 10.1 |
| PEE6 | —(CH₂)₆— | —(CH₂)₄— | t-Butyl group | t-Butyl group | 520 | 44 | 130 | 9.7 |
| PEE7 | —(CH₂)₆— | —(CH₂)₄— | Phenyl group | Phenyl group | 460 | 45 | 125 | 9.7 |
| PEE8 | —(CH₂)₆— | —(CH₂)₄— | Phenyl group | Phenyl group | 630 | 40 | 120 | 9.7 |
| PEE9 | —(CH₂)₆— | —(CH₂)₄— | Phenyl group | Phenyl group | 420 | 43 | 135 | 9.7 |
| PEE10 | —(CH₂)₆— | —(CH₂)₄— | Phenyl group | Phenyl group | 670 | 48 | 105 | 9.7 |
| PEE11 | —(CH₂)₆— | —(CH₂)₄— | Phenyl group | Phenyl group | 550 | 35 | 130 | 9.7 |
| PEE12 | —(CH₂)₆— | —(CH₂)₄— | Phenyl group | Phenyl group | 550 | 49 | 125 | 9.7 |
| PEE13 | —(CH₂)₆— | —(CH₂)₄— | Phenyl group | Phenyl group | 550 | 32 | 120 | 9.7 |
| PEE14 | —(CH₂)₆— | —(CH₂)₄— | Phenyl group | Phenyl group | 550 | 53 | 105 | 9.7 |
| PEE15 | —(CH₂)₆— | —(CH₂)₄— | Phenyl group | Phenyl group | 550 | 43 | 135 | 9.7 |
| PEE16 | —(CH₂)₆— | —(CH₂)₄— | Phenyl group | Phenyl group | 550 | 43 | 105 | 9.7 |
| PEE17 | —(CH₂)₆— | —(CH₂)₄— | Phenyl group | Phenyl group | 550 | 43 | 150 | 9.7 |
| PEE18 | —(CH₂)₆— | —(CH₂)₄— | Phenyl group | Phenyl group | 550 | 43 | 95 | 9.7 |

Adipic Acid Ester-Containing Compound

An adipic acid ester-containing compound (compound containing adipic acid ester) refers to an adipic acid ester itself or a compound obtained by mixing an adipic acid ester and a component other than the adipic acid ester (compound different from adipic acid ester).

Examples of the adipic acid ester include adipic acid diester and adipic acid polyester. Specific examples of the adipic acid ester include adipic acid diester represented by Formula (2-1) and adipic acid polyester represented by Formula (2-2).

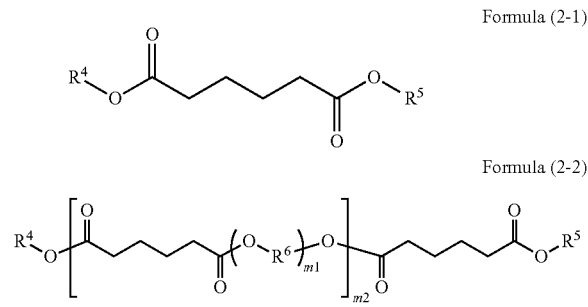

Formula (2-1)

Formula (2-2)

In Formulae (2-1) and (2-2), each of $R^4$ and $R^5$ independently represents an alkyl group or a polyoxyalkyl group $[-(C_xH_{2x}-O)_y-R^{41}]$ ($R^{41}$ represents an alkyl group. x represents an integer of 1 to 6. y is an integer of 1 to 6).

$R^6$ represents an alkylene group.

m1 represents an integer of 1 to 5.

m2 represents an integer of 1 to 10.

In Formulae (2-1) and (2-2), as an alkyl group represented by $R^4$ and $R^5$, the alkyl group having 1 to 6 of carbon atoms is preferable, and the alkyl group having 2 to 4 carbon atoms is more preferable. The alkyl group may be any of straight-chain, branched-chain, and cyclic, but a straight-chain or branched-chain alkyl group is preferable.

In Formulae (2-1) and (2-2), with respect to a polyoxyalkyl group $[-(C_xH_{2x}-O)_y-R^{41}]$ represented by $R^4$ and $R^5$, as an alkyl group represented by $R^{41}$, the alkyl group having 1 to 6 carbon atoms is preferable, and the alkyl group having 2 to 4 carbon atoms is more preferable. The alkyl group may be any of straight-chain, branched-chain, and cyclic, but a straight-chain or branched-chain alkyl group is preferable.

x represents an integer of 1 to 6. y represents an integer of 1 to 6.

In Formulae (2-1) and (2-2), as an alkylene group represented by $R^6$, the alkylene group having 1 to 6 carbon atoms is preferable, and the alkylene group having 2 to 4 carbon atoms is more preferable. The alkylene group may be any of straight-chain, branched-chain, and cyclic, but a straight-chain or branched-chain alkylene group is preferable.

In Formulae (2-1) and (2-2), groups represented by respective reference numerals may be substituted with a substituent. Examples of the substituent include an alkyl group, an aryl group, and an acyl group.

A molecular weight of an adipic acid ester (or weight average molecular weight) is preferably from 100 to 10,000, and more preferably 200 to 3,000. In addition, the weight average molecular weight is a value measured by the same measurement method as that of the weight average molecular weight of the polyether ester compound described above.

Hereinafter, specific examples of the adipic acid ester-containing compound are described below, but the exemplary embodiment of the invention is not limited thereto.

|  | Material Name | Product Name | Manufacturer |
|---|---|---|---|
| ADP1 | Adipic acid diester | DAIFATTY-101 | Daihachi Chemical Industry Co., Ltd. |
| ADP2 | Adipic acid diester | ADEKA CIZER RS-107 | ADEKA Corporation |
| ADP3 | Adipic acid polyester | POLYCIZER W-230-H | DIC Corporation |
| ADP4 | Adipic acid diester | DAIFATTY-121 | Daihachi Chemical Industry Co., Ltd. |
| ADP5 | Adipic acid diester | DAIFATTY-110 | Daihachi Chemical Industry Co., Ltd. |

(C) Polyolefin-Containing Polyfunctional Elastomer

The polyolefin-containing polyfunctional elastomer includes polyolefin obtained by polymerizing olefins having 2 to 4 carbon atoms as a main component, that is, is polymerized by using 50% by weight or greater of the olefin with respect to the total amount of the monomer components. In addition, the polyolefin-containing polyfunctional elastomer includes plural functional groups reactable with (A) the cellulose ester resin.

Further, as the main component of the polyolefin-containing polyfunctional elastomer, polyethylene is preferable.

As the plural functional groups (functional group reactable with cellulose ester resin) that the polyolefin-containing polyfunctional elastomer has in a molecule, at least one selected from the epoxy group and the glycidyl group is preferable.

Examples of the polyolefin-containing polyfunctional elastomer include a polyolefin-glycidyl methacrylate copolymer obtained by polymerizing olefins having 2 to 4 carbon atoms, and specific examples of the polyolefin-containing polyfunctional elastomer include an ethylene-glycidyl methacrylate copolymer, an ethylene-vinyl acetate-glycidyl methacrylate copolymer, an ethylene-methyl acrylate-glycidyl methacrylate copolymer, an ethylene-ethyl acrylate-glycidyl methacrylate copolymer, an ethylene-butyl acrylate-glycidyl methacrylate copolymer, an ethylene-acrylic acid-acrylate-glycidyl methacrylate copolymer, an ethylene-methacrylate-glycidyl methacrylate copolymer, a copolymer obtained by graft-polymerizing glycidyl methacrylate with an ethylene-methacrylic acid-methacrylate copolymer, a copolymer obtained by graft-polymerizing glycidyl methacrylate with an ethylene-propylene copolymer, a copolymer obtained by graft-polymerizing glycidyl methacrylate with an ethylene-propylene-diene copolymer, a copolymer obtained by graft-polymerizing glycidyl methacrylate with an ethylene-α olefin copolymer, a copolymer obtained by graft-polymerizing glycidyl methacrylate with an ethylene-vinyl acetate copolymer, a propylene-glycidyl methacrylate copolymer, and a propylene-glycidyl methacrylate graft copolymer.

Among these, the ethylene-glycidyl methacrylate copolymer, the ethylene-vinyl acetate-glycidyl methacrylate copolymer, the ethylene-acrylate-glycidyl methacrylate copolymer, the copolymer obtained by graft-polymerizing glycidyl methacrylate with an ethylene-propylene copolymer, the copolymer obtained by graft-polymerizing glycidyl methacrylate with an ethylene-propylene-diene copolymer, the propylene-glycidyl methacrylate copolymer, and the propylene-glycidyl methacrylate graft copolymer are preferable.

Hereinafter, specific examples of the polyolefin-containing polyfunctional elastomer are described below, but the exemplary embodiment of the invention is not limited thereto.

| | | Material name | Product Name | Manufacturer |
|---|---|---|---|---|
| Elastomer | 1 | Ethylene-maleic anhydride-glycidyl methacrylate copolymer | LOTARDER | ARKEMA K.K. |
| | 2 | Ethylene-glycidyl methacrylate-methyl acrylate copolymer | BONDFAST 7M | Sumimoto Chemical Co., Ltd. |
| | 3 | Ethylene-glycidyl methacrylate copolymer | BONDFAST 2C | Sumimoto Chemical Co., Ltd. |
| | 4 | Copolymer obtained by graft-polymerizing acrylonitrile styrene (AS) with ethylene-glycidyl methacrylate copolymer | MODIPER 4400 | NOF Corporation |
| | 5 | Copolymer obtained by graft-polymerizing methyl methacrylate with ethylene-glycidyl methacrylate copolymer | MODIPER 4200 | NOF Corporation |

Content of (A) Cellulose ester resin, (B) Non-reactive plasticizer, and (C) Polyolefin-containing polyfunctional elastomer With respect to 100 parts by weight of (A) the cellulose ester resin, the content of (B) the non-reactive plasticizer is preferably from 1 part by weight to 40 parts by weight, and more preferably from 5 parts by weight to 30 parts by weight.

If the content of (B) the non-reactive plasticizer is 1 part by weight or greater, more excellent shock resistance may be obtained. In addition, if the content is 40 parts by weight or less, bleeding (deposition phenomenon on surface) of the non-reactive plasticizer is prevented.

With respect to 100 parts by weight of (A) the cellulose ester resin, the content of (C) the polyolefin-containing polyfunctional elastomer is preferably from 0.5 parts by weight to 20 parts by weight, and more preferably from 1 part by weight to 10 parts by weight.

If the content of (C) the polyolefin-containing polyfunctional elastomer is 0.5 parts by weight or greater, more excellent shock resistance may be obtained. Meanwhile, if the content is 20 parts by weight or less, kneading properties of the resin composition as a whole is deteriorated.

Further, the weight ratio of (A) the cellulose ester resin to the total amount of the resin composition is preferably from 10% by weight to 90% by weight, and more preferably from 40% by weight to 95% by weight.

Other Components

The resin composition according to the exemplary embodiment may contain components other than the components described above, if necessary. Examples of the other components include a flame retardant, a compatabilizer, a plasticizer, an antioxidant, a release agent, a light resisting agent, a weathering agent, a coloring agent, a pigment, a modifying agent, a drip preventing agent, an antistatic agent, a hydrolysis-resistant agent, a filler, and a reinforcing agent (glass fiber, carbon fiber, talc, clay, mica, glass flake, milled glass, glass beads, crystalline silica, alumina, silicon nitride, aluminum nitride, boron nitride, and the like). The content of these components are preferably from 0% by weight to 5% by weight with respect to the total amount of the resin composition, respectively. Here, the term "0% by weight" means not containing other components.

The resin composition according to the exemplary embodiment may include resins other than the resins described above. However, the weight ratio of the other resin to the total amount of the resins is preferably 5% by weight or less.

Examples of the other resin include well-known thermoplasticity resins in the related art. Specific examples of the other resin include a polycarbonate resin; a polypropylene resin; a polyester resin; a polyolefin resin; a polyester carbonate resin; a polyphenylene ether resin; a polyphenylene sulfide resin; a polysulfone resin; a polyether sulfone resin; a polyarylene resin; a polyether imide resin; a polyacetal resin; a polyvinyl acetal resin; a polyketone resin; a polyether ketone resin; a polyether etherketone resin; a polyaryl ketone resin; a polyether nitrile resin; a liquid crystal resin; a polybenzimidazole resin; a polyparabanic acid resin; a vinyl polymer or copolymer resin obtainable by polymerizing or copolmerizing at least one vinyl monomer selected from an aromatic alkenyl compound, methacrylate, acrylate, and a vinyl cyanide compound; a diene-aromatic alkenyl compound copolymer resin; a vinyl cyanide-diene-aromatic alkenyl compound copolymer resin; an aromatic alkenyl compound-diene-vinyl cyanide-N-phenylmaleimide copolymer resin; vinyl cyanide-(ethylene-diene-propylene (EPDM))-aromatic alkenyl compound copolymer resin; a vinyl chloride resin; and a chlorinated vinyl chloride resin. These resins may be used singly, or two or more types thereof may be used in combination.

Method of Manufacturing Resin Composition

For example, the resin composition according to the exemplary embodiment is manufactured by melting and kneading the mixture of the components described above. In addition, the resin composition according to the exemplary embodiment is manufactured by dissolving the components in a solvent. As melting and kneading apparatuses, well-known apparatuses may be used, and specific examples thereof include a twin screw extruder, a Henschel mixer, a Banbury mixer, a single-screw extruder, a multi-screw extruder, and a co-kneader.

Resin Molded Article

The resin molded article according to the exemplary embodiment contains the resin composition according to the exemplary embodiment. That is, the resin molded article according to the exemplary embodiment is configured with the same composition with the resin composition according to the exemplary embodiment.

Specifically, the resin molded article according to the exemplary embodiment is obtainable by molding the resin composition according to the exemplary embodiment. As a molding method, for example, injection molding, extrusion molding, blow molding, hot press molding, calendar molding, coating molding, cast molding, dipping molding, vacuum molding, and transfer molding may be applied.

As the molding method of the resin molded article according to the exemplary embodiment, in view of the high degree of freedom for molding, the injection molding is preferable. For example, the cylinder temperature of the injection molding is from 200° C. to 300° C., and preferably from 240° C. to 280° C. For example, the mold temperature of the injection molding is from 40° C. to 90° C., and preferably from 60° C. to 80° C. For example, injection molding may be performed by using NEX500 manufactured by Nissei Plastic Industrial Co., Ltd., NEX150 manufactured by Nissei Plastic Industrial Co., Ltd., NEX70000 manufactured by Nissei Plastic Industrial Co., Ltd., and SE50D manufactured by Toshiba Machine Co., Ltd.

The resin molded article according to the exemplary embodiment is appropriately used in electrical and electronic devices, business machines, home appliance, car interior materials, containers, and the like. Specific examples thereof include housings of electrical and electronic devices or home appliances; various components of electrical and electronic devices or home appliances; interior parts of cars; storage cases for CD-ROM or DVD; tableware; drink bottles; food trays; wrapping materials; films; and sheets.

EXAMPLE

The exemplary embodiment of the invention is more specifically described with reference to examples, but the exemplary embodiment of the invention is not limited thereto.

Examples 1 to 13 and Comparative Examples 1 to 6

Materials of compositions presented in Table 1 are inserted into a twin screw kneader (TEM58SS manufactured by Toshiba Machine Co., Ltd.) and are kneaded at a cylinder temperature of 240° C. to obtain resin compositions (compound).

Subsequently, the obtained resin compositions are molded using an injection molding apparatus (NEX150E manufactured by Nissei Plastic Industrial Co., Ltd.) at a cylinder temperature of 250° C. and at a mold temperature of 60° C. Molded articles of 2 mm thickness×6 cm×6 cm are obtained.

EVALUATION

Shock Resistance (Steel Ball Drop Test)

The manufactured molded articles are allowed to be preserved for one day at room temperature (25° C.), and then steel ball drop tests are performed. In the steel ball drop test, the manufactured molded articles are fixed, and states of fractures are evaluated when 500 g of weights are dropped from respective heights. Evaluation tests are performed for three times respectively, and states of the worst ones are evaluated as results. Criteria are as follows.

A: No fractures or small cracks
B: Fractures without holes
C: Fractures with holes

TABLE 1

| | | Cellulose Resin | | Plasticizer | | | | Elastomer | | | | | | |
| | | A | B | A | B | C | D (Comparative) | 1 | 2 | 3 | 4 | 5 | 6 (Comparative) | 7 (Comparative) |
|---|---|---|---|---|---|---|---|---|---|---|---|---|---|---|
| Example | 1 | 100 | | 10 | | | | 10 | | | | | | |
| | 2 | 100 | | | 20 | | | 5 | | | | | | |
| | 3 | 100 | | | | 20 | | 3 | | | | | | |
| | 4 | 100 | | 10 | | | | | 5 | | | | | |
| | 5 | 100 | | | | 10 | | | 5 | | | | | |
| | 6 | | 100 | 20 | | | | | | 1 | | | | |
| | 7 | | 100 | | 10 | | | | | 8 | | | | |
| | 8 | | 100 | 20 | | | | | | | 3 | | | |
| | 9 | | 100 | 20 | | | | | | | | 5 | | |
| | 10 | | 100 | 10 | | | | | | | | | 5 | |
| | 11 | | 100 | 10 | | | | | | | | | | 10 |
| | 12 | 100 | | 5 | | | | 5 | | | | | | |
| | 13 | 100 | | | | 15 | | 5 | | | | | | |
| Comparative | 1 | 100 | | | | | | | | | | | | |
| Example | 2 | 100 | | 10 | | | | | | | | | | |
| | 3 | 100 | | | | | | 5 | | | | | | |
| | 4 | 100 | | 10 | | | | | | | | | 5 | |
| | 5 | 100 | | 10 | | | | | | | | | | 5 |
| | 6 | 100 | | | | | 10 | 0:00 | | | | | | |

(Unit: Parts by weight)

Types of materials in Table 1 are as follows.
Cellulose Ester Resin
Cellulose resin A: L50 manufactured by Daicel Corporation
Cellulose resin B: L20 manufactured by Daicel Corporation
Plasticizer
Plasticizer A: DAIFATTY 121 manufactured by Daihachi Chemical Industry Co., Ltd. (Material name: adipic acid diester)
Plasticizer B: RS1000 manufactured by ADEKA Corporation (Material name: Polyether ester)
Plasticizer C: DAIFATTY 110 manufactured by Daihachi Chemical Industry Co., Ltd. (Material name: adipic acid diester)
Plasticizer D: SANSO CIZER E-PO manufactured by New Japan Chemical Co., Ltd. (Material name: Epoxyhexahydrophthalic acid diepoxystearyl)
Elastomer
Elastomer 1
LOTARDER manufactured by ARKEMA K.K.
Material name: Ethylene-maleic anhydride-glycidyl methacrylate copolymer
Main component: Polyethylene=68% by weight
Functional group: Glycidyl group, maleic anhydride group
Elastomer 2
BONDFAST 7M manufactured by Sumimoto Chemical Co., Ltd.
Material name: Ethylene-glycidyl methacrylate-methyl acrylate copolymer
Main component: Polyethylene=67% by weight
Functional group: Glycidyl group
Elastomer 3
BONDFAST 2C manufactured by Sumimoto Chemical Co., Ltd.
Material name: Ethylene-glycidyl methacrylate copolymer
Main component: Polyethylene=94% by weight
Functional group: Glycidyl group
Elastomer 4
MODIPER (Registered trademark) A4400 manufactured by NOF Corporation
Material name: Copolymer obtained by graft-polymerizing acrylonitrile styrene copolymer (AS) with ethylene-glycidyl methacrylate copolymer
Main component: Polyethylene=59.5% by weight
Functional group: Glycidyl group
Elastomer 5
MODIPER (Registered trademark) A4200 manufactured by NOF Corporation
Material name: Copolymer obtained by graft-polymerizing methyl polymethacrylate with ethylene-glycidyl methacrylate copolymer
Main component: Polyethylene=59.5% by weight
Functional group: Glycidyl group
Elastomer 6
LA4475 manufactured by Kuraray Co., Ltd.
Material name: Oxazoline-containing styrene
Main component: Styrene
Elastomer 7
EPOCROS (Registered trademark) RPS1005 manufactured by Nippon Shokubai Co., Ltd.
Material name: Block copolymer of methyl methacrylate and butyl acrylate
Main component: Methyl methacrylate

TABLE 2

| | | \multicolumn{6}{c}{Steel ball dropping height} |
| --- | --- | --- | --- | --- | --- | --- | --- |
| | | 200 mm | 400 mm | 600 mm | 800 mm | 1000 mm | 1200 mm |
| Examples | 1 | A | A | A | A | B | B |
| | 2 | A | A | A | A | A | A |
| | 3 | A | A | A | A | A | B |
| | 4 | A | A | A | A | B | C |
| | 5 | A | A | A | A | B | C |
| | 6 | A | A | B | B | C | C |
| | 7 | A | A | A | A | B | B |
| | 8 | A | A | A | A | A | A |
| | 9 | A | A | A | A | A | A |
| | 10 | A | A | B | B | C | C |
| | 11 | A | A | A | B | B | C |
| | 12 | A | A | B | C | C | C |
| | 13 | A | A | A | A | A | B |
| Comparative Examples | 1 | C | C | C | C | C | C |
| | 2 | C | C | C | C | C | C |
| | 3 | C | C | C | C | C | C |
| | 4 | B | C | C | C | C | C |
| | 5 | C | C | C | C | C | C |
| | 6 | B | C | C | C | C | C |

From the above results, it is found that the examples of the invention have better evaluation results of the shock resistance than comparative examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. A resin composition comprising: at least
a cellulose ester resin;
a non-reactive plasticizer that does not have a functional group reactable with the cellulose ester resin; and
a polyolefin-containing polyfunctional elastomer that includes polyolefin obtained by polymerizing olefins having 2 to 4 carbon atoms as a main component and that has a plurality of functional groups reactable with the cellulose ester resin;
wherein:
the non-reactive plasticizer is at least one selected from a polyether ester compound and a compound containing adipic acid ester;
the polyether ester compound is a compound represented by Formula (2):

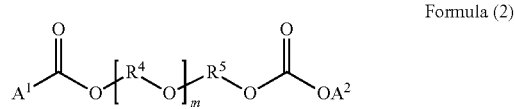

Formula (2)

wherein each of $R^4$ and $R^5$ independently represents an alkylene group having 2 to 10 carbon atoms; each of $A^1$ and $A^2$ independently represents an alkyl group having 1 to 6 carbon atoms, an aryl group having 6 to 12 carbon atoms, or an aralkyl group having 7 to 18 carbon atoms; and m represents an integer of 1 or greater; and the compound containing the adipic acid ester is a compound represented by Formula (2-1) or Formula (2-2):

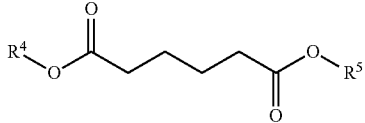

Formula (2-1)

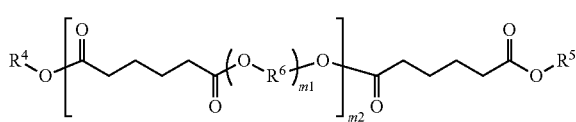

Formula (2-2)

wherein each of $R^4$ and $R^5$ independently represents an alkyl group or a polvoxyalkyl group [—$(C_xH_{2x}$—$O)_y$—$R^{41}$]; $R^{41}$ represents an alkyl group; x represents an integer of 1 to 6; y is an integer of 1 to 6: $R^6$ represents an alkylene group; m1 represents an integer of 1 to 5 and m2 represents an integer of 1 to 10.

2. The resin composition according to claim 1, wherein the cellulose ester resin is a cellulose ester resin represented by Formula (1) below:

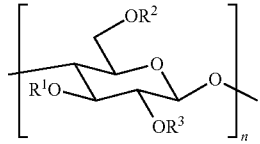

Formula (1)

wherein each of $R^1$, $R^2$, and $R^3$ respectively represents a hydrogen atom or an acyl group having 1 to 3 carbon atoms, and n is an integer of 1 or greater.

3. The resin composition according to claim 1, wherein the polyolefin-containing polyfunctional elastomer includes at least one selected from an epoxy group and a glycidyl group as a functional group.

4. The resin composition according to claim 2, wherein the polyolefin-containing polyfunctional elastomer includes at least one selected from an epoxy group and a glycidyl group as a functional group.

5. The resin composition according to claim 1, wherein a content of the non-reactive plasticizer is 1 part by weight to 40 parts by weight with respect to 100 parts by weight of the cellulose ester resin.

6. The resin composition according to claim 1, wherein a content of the polyolefin-containing polyfunctional elastomer is 0.5 parts by weight to 20 parts by weight with respect to 100 parts by weight of the cellulose ester resin.

7. A resin molded article comprising the resin composition according to claim 1.

8. A resin molded article comprising the resin composition according to claim 2.

9. The resin composition according to claim 2, wherein:
each of $R^1$, $R^2$, and $R^3$ respectively represents a hydrogen atom or an acetyl group; and
a substitution degree of the cellulose ester resin is 2.1 to 2.6.

\* \* \* \* \*